(12) United States Patent
Shoji et al.

(10) Patent No.: US 9,114,459 B2
(45) Date of Patent: Aug. 25, 2015

(54) MACHINE TOOL

(75) Inventors: Masahiro Shoji, Komatsu (JP); Satoshi Awatani, Komatsu (JP); Shinya Yamada, Komatsu (JP)

(73) Assignee: KOMATSU NTC LTD., Toyama (JP)

( * ) Notice: Subject to any disclaimer, the term of this patent is extended or adjusted under 35 U.S.C. 154(b) by 202 days.

(21) Appl. No.: 13/703,806

(22) PCT Filed: Jun. 22, 2011

(86) PCT No.: PCT/JP2011/064209
§ 371 (c)(1),
(2), (4) Date: Dec. 12, 2012

(87) PCT Pub. No.: WO2011/162275
PCT Pub. Date: Dec. 29, 2011

(65) Prior Publication Data
US 2013/0087024 A1 Apr. 11, 2013

(30) Foreign Application Priority Data
Jun. 24, 2010 (JP) ................. 2010-143340

(51) Int. Cl.
*B23P 15/00* (2006.01)
*B23B 5/18* (2006.01)
*B23B 25/06* (2006.01)
*B23B 5/22* (2006.01)

(52) U.S. Cl.
CPC . *B23B 5/18* (2013.01); *B23B 25/06* (2013.01); *Y10T 82/19* (2015.01)

(58) Field of Classification Search
CPC .......... B23B 5/18; B23B 31/36; B23B 31/16; B24B 5/42

USPC ........................................... 82/106, 108, 109
See application file for complete search history.

(56) References Cited

U.S. PATENT DOCUMENTS

| 5,230,265 | A | * | 7/1993 | Schmid ........................... 82/106 |
| 5,622,092 | A | * | 4/1997 | Gleason .......................... 82/106 |
| 6,322,300 | B1 | * | 11/2001 | Santorius et al. ............. 409/199 |
| 6,973,861 | B2 | * | 12/2005 | Shimomura .................... 82/106 |
| 7,424,776 | B2 | * | 9/2008 | Shoji et al. ................. 29/888.08 |

FOREIGN PATENT DOCUMENTS

| JP | 1-310802 A | 12/1989 |
| JP | 2001-62673 A | 3/2001 |

(Continued)

OTHER PUBLICATIONS

International Search Report of corresponding PCT Application No. PCT/JP2011/064209.

*Primary Examiner* — Will Fridie, Jr.
(74) *Attorney, Agent, or Firm* — Global IP Counselors, LLP

(57) ABSTRACT

A machine tool tier machining a bar-shaped workpiece loaded in a first orientation includes first and second chucks, first and second driving parts, a machining tool and a control part. Each of the first and second chucks has a workpiece drop opening that opens toward the outside in a radial direction from a middle portion of the first or second chuck. The first and second driving parts are respectively provided to rotate the first and second chucks. The machining tool is configured to machine the workpiece clamped by at least one of the first and second chucks. The control part is configured to control clamping of the workpiece by the first and second chucks and to control rotation angles of the first and second chucks by the first and second driving parts to change an orientation of the workpiece from the first orientation to a second orientation.

7 Claims, 2 Drawing Sheets

(56) References Cited

FOREIGN PATENT DOCUMENTS

| JP | 2001-105209 A | 4/2001 |
| JP | 2003-94262 A | 4/2003 |
| JP | 2007-245282 A | 9/2007 |

* cited by examiner

MACHINE TOOL

CROSS-REFERENCE TO RELATED APPLICATIONS

This application claims priority to Japanese Patent Application No. 2010-143340 filed on Jun. 24, 2010, the disclosure of which is hereby incorporated herein by reference in its entirety.

TECHNICAL FIELD

The present invention relates to a machine tool, and in particular to a machine tool for machining a bar-shaped workpiece loaded in a first orientation.

DESCRIPTION OF THE RELATED ART

A device described for example in Japanese Patent Laid-open No. 2001-105209 is used when machining a bar-shaped workpiece such as a crankshaft. The device disclosed in Japanese Patent Laid-open No. 2001-105209 includes a pair of chucks for clamping both ends of a workpiece, and a workpiece drive motor that causes the pair of chucks to rotate in synchronization. A workpiece drive motor is provided for each chuck. Both of the workpiece drive motors in the device are controlled in synchronization by a control means thus allowing the pair of chucks to be rotated in synchronization.

Japanese Patent Laid-open No. 2003-94262 describes a crankshaft machining system that includes a plurality of steps. Although not disclosed in Japanese Patent Laid-open No. 2003-94262, the crankshaft is often set in different orientations in each step. For example, in the step before the crankshaft journal machining step, machining is performed with the crankshaft set in a first orientation, and then machining is performed with the crankshaft set in a second orientation in subsequent steps. The rotation angle positions, or namely the phases of the workpiece, are different in the first and second orientations.

SUMMARY

The following detailed description examines in particular a machining line including a crankshaft turning process machine for machining a crankshaft journal with respect to Japanese Patent Laid-open No. 2003-94262.

Generally, an initial step is performed in the step before the crankshaft journal machining step. In the initial step, the crankshaft (workpiece) is set in a first orientation and cutting and center hole machining on both ends are performed. After the initial step is completed, the workpiece is conveyed to the crankshaft turning process machine by a loader. After the journal is machined in the crankshaft turning process machine, the machined workpiece is conveyed to the next step by the loader. The pin portion of the crankshaft is machined in the next step, but the workpiece needs to be set in a second orientation in which the phase of the workpiece is changed.

A pair of chucks for clamping the workpiece are provided in the crankshaft turning process machine, and each chuck is provided with one workpiece drop opening. The workpiece conveyed by the loader is loaded through the workpiece drop opening to a set position in each chuck. After the machining is completed, the workpiece is unloaded by the loader through the workpiece drop opening. As a result, when the workpiece is loaded at a certain phase (orientation) in the crankshaft turning process machine, the workpiece is unloaded after machining in the same phase (orientation) in which the workpiece was loaded.

In the machining line that includes the crankshaft turning process machine described above, a mechanism for changing the orientation, namely changing the phase of the workpiece, is required to be provided in the machine line since the machining line has steps in which the workpiece is set in different orientations. The provision of such a mechanism for changing the phase of the workpiece leads to a longer machining line and also leads to an increase in costs for building the machining line.

An object of the present invention is to build a simple and low-cost machining line without major changes to the configuration of a machine tool for machining a crankshaft.

A machine tool according to a first aspect of the present invention is a tool for machining a bar-shaped workpiece loaded in a first orientation, and includes a first chuck and a second chuck, a first driving part and a second driving part, a machining tool, and a control part. The first chuck and the second chuck each have a workpiece drop opening that opens toward the outside in the radial direction from the middle, and the first and second chucks clamp the ends of the workpiece loaded through the workpiece drop opening. The first driving part and the second driving part are respectively provided in correspondence with the first and second chucks to rotate the chucks. The machining tool machines the workpiece clamped by at least one of the first and second chucks. The control part controls the clamping of the workpiece by the chucks, and controls a rotation angle of each chuck through the driving part to change an orientation of the workpiece from a first orientation to a second orientation.

At this time, a workpiece machined in the first orientation in a previous step is conveyed in the first orientation by a loader and loaded into the first and second chucks via the workpiece drop opening. Both of the ends of the workpiece are then set in the chucks. During the machining step, the clamping of the workpiece by the chucks and rotation angles of the chucks are controlled so that the orientation of the workpiece is changed to the second orientation by the controlling. The workpiece in the second orientation is then unloaded through the workpiece drop opening.

Since the orientation of the workpiece is changed by the machine tool that performs the machining on the workpiece, a special mechanism for changing the orientation of the workpiece is not necessary in the machining line. As a result, building a simple machining line is possible. Since the orientation of the workpiece is changed by controlling the clamping and the rotation positions of the chucks, a special mechanism for changing orientations does not need to be newly provided.

The machine tool according to a second aspect of the present invention includes the control part that changes the orientation of the workpiece with the following operating procedures related to the machine tool of the first aspect:

(a) Clamping a first end of the workpiece with the first chuck and releasing clamping of a second end of the workpiece by the second chuck.

(b) Rotating the first chuck by the first driving part to change the workpiece to the second orientation.

(c) Clamping the second end of the workpiece with the second chuck and releasing clamping of a first end of the workpiece by the first chuck.

(d) Rotating the first chuck by the first driving part to position the first chuck in a loading and unloading rotation position so that the workpiece drop opening faces a workpiece loading and unloading direction.

By performing the above operating procedures, the orientation of the workpiece can be changed merely by changing a control program without adding a special mechanism to a conventional machine tool.

The machine tool according to a third aspect of the present invention includes the control part of the machine tool related to the first and second aspect that changes the orientation of the workpiece during a workpiece grip exchange when machining one end side or another end side in the axial direction of the workpiece.

Since the orientation of the workpiece is changed in a workpiece machining step, an increase in the overall machining time due to changing the orientation of the workpiece can be suppressed.

The machine tool according to a fourth aspect of the present invention includes the control part of the machine tool related to the first aspect machining and changing the orientation of the workpiece with the following operating procedures:

(a) Clamping a first end of the workpiece with the first chuck and releasing clamping of a second end of the workpiece by the second chuck.

(b) Rotating the first chuck by the first driving part to change the workpiece to the second orientation.

(c) Machining a region at the second chuck side of the workpiece with a machining tool.

(d) Clamping the second end of the workpiece with the second chuck and releasing clamping of the first end of the workpiece by the first chuck.

(e) Rotating the first chuck by the first driving part to position the first chuck in a loading and unloading rotation position so that the workpiece drop opening faces a workpiece loading and unloading direction.

(f) Machining a region at the first chuck side of the workpiece with a machining tool.

(g) Clamping both ends of the workpiece with the first chuck and the second chuck to machine a remaining area of the workpiece with the machining tool.

Since the orientation of the workpiece is changed in the workpiece during the workpiece grip exchange in the workpiece machining step in the same way as the third aspect, an increase in the overall machining time due to changing the orientation of the workpiece can be suppressed.

The machine tool according to a fifth aspect of the present invention includes the workpiece related to any one of the first to fourth aspects being a crankshaft.

The machine tool according to a sixth aspect of the present invention includes the machining tool related to the fifth aspect performing cutting on a crankshaft journal and on an end to the outside of the journal in the axial direction.
A simple machining line configuration can be achieved without a major change to the machine tool configurations in each step with the above invention.

DESCRIPTION OF EMBODIMENTS

Overall Configuration

Figure 1:
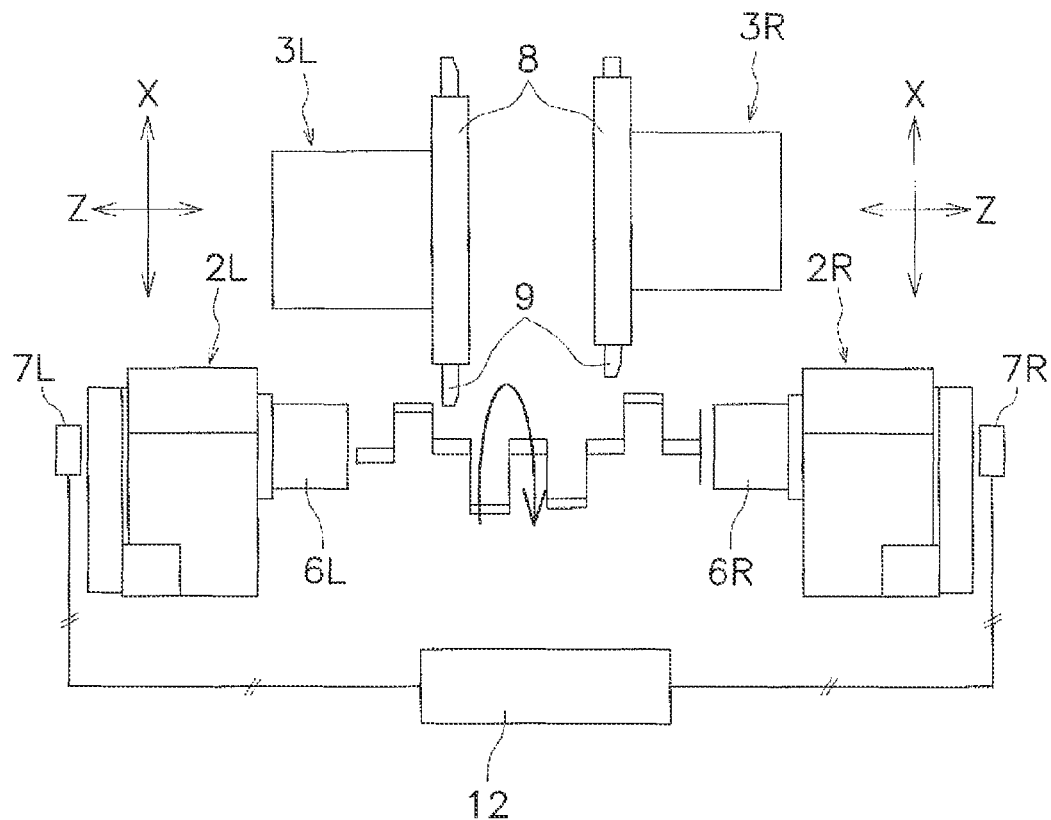
FIG. 1 is a schematic block diagram of a crankshaft turning process machine according to a first embodiment of the present invention.

FIG. 1 is a schematic block diagram of a crankshaft turning process machine according to a first embodiment of the present invention. The crankshaft turning process machine includes a pair of rotation drive devices 2R, 2L mounted on a bed (not shown), and a pair of tool drive units 3R, 3L.

The pair of rotation drive devices 2R, 2L are disposed at left and right ends on the front surface of the bed, and are capable of moving in the left and right directions. The rotation drive devices 2R, 2L each have chucks 6R, 6L, and motors 7R, 7L as a driving part.

Figure 3:
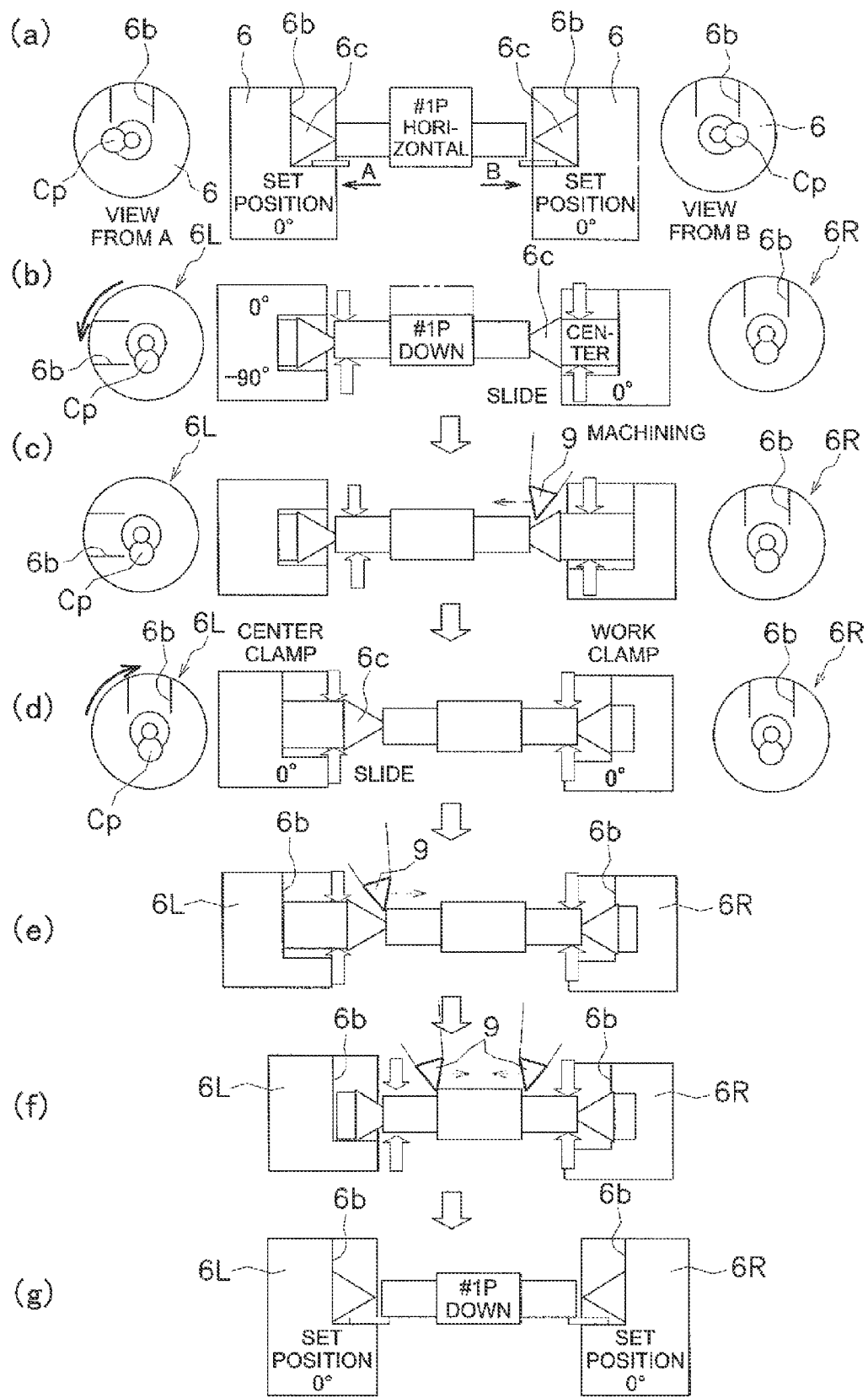
FIG. 3 describes operating procedures for changing the phase of a workpiece.

The chucks 6R, 6L are respectively provided on surfaces in which one of the rotation drive devices 2R, 2L faces the other one of the rotation drive devices 2L, 2R. The chucks 6R, 6L are each provided with three jaws for holding both ends of the crankshaft (hereinbelow referred to as "workpiece") to be machined. The chucks 6R, 6L are each provided with a workpiece drop opening 6b (see FIG. 3) that opens from the middle portion toward the outside in the radial direction. The workpiece is set in the chucks 6R, 6L through the workpiece drop opening 6b. The chucks 6R, 6L are each provided with a center 6c that supports a center hole formed in both ends of the workpiece as illustrated in FIG. 3.

The motors 7R, 7L rotate the chucks 6R, 6L respectively, and are able to rotate the left and right chucks 6R, 6L in synchronization or independently.

The pair of tool drive units 3R, 3L are free to move in the axial direction (Z axis) of the workpiece and in a direction (X axis in front and back directions in FIG. 1) orthogonal to the axial direction. A tool-post 8 is fixed to the surface facing the Z-axis direction of each of the tool drive units 3R, 3L. A tool 9 is mounted in a removable manner to a leading end of the tool-post 8.

The motors 7R, 7L provided on the pair of rotation drive devices 2R, 2L are each controlled by a controller 12. Thus, clamping of the workpiece by the chucks 6R, 6L and the unclamping therefrom, and rotation angles of the chucks 6R, 6L are controlled by the controller (control part) 12 to perform phase changes of the workpiece.

Machining Line

Figure 2:
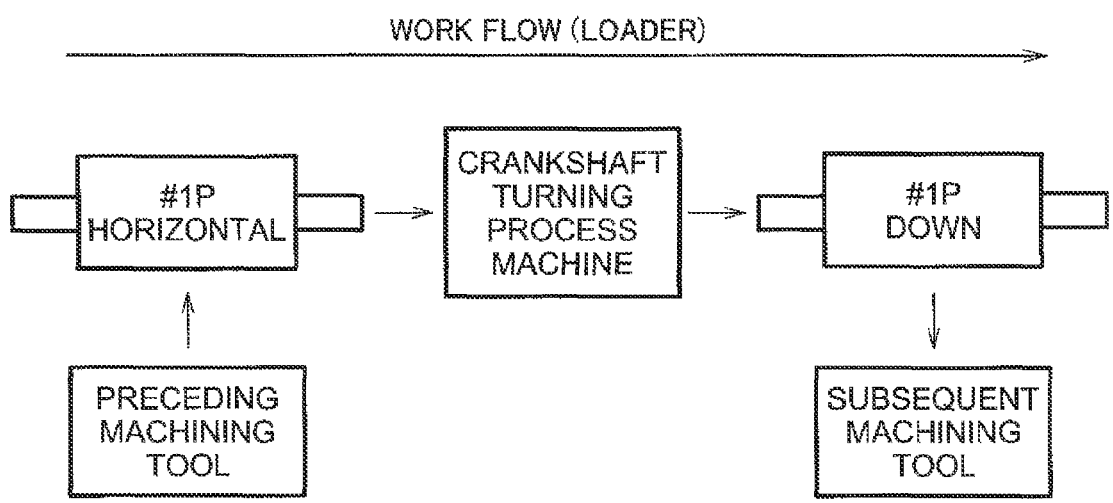
FIG. 2 illustrates loading and unloading of a workpiece to and from the crankshaft turning processing machine.

The steps before and after the crankshaft turning process machine will be simply described next with reference to FIG. 2. Cutting of the journal of the crankshaft that is a workpiece is performed on the crankshaft turning process machine. An initial step is performed by an upstream machining tool in a stage before the journal cutting. In the initial step, the workpiece material formed by forging or casting is loaded and processes such as determining the end widths and drilling center holes at both ends are performed. The width-determining process performed at both ends includes cutting the end faces of the workpiece to determine the length of the workpiece. The center hole drilling process includes forming center holes at both end faces as rotation references of the workpiece. After the initial step is completed, the workpiece is loaded into the crankshaft turning process machine by a loader as illustrated in FIG. 2. After the journal is machined on the crankshaft turning process machine, the workpiece is unloaded by the loader and conveyed to the crank pin machining step performed by the next machining tool. The crank pin machining is performed by a crankshaft milling machine in the crank pin machining step.

In the initial step in the above machining line, the workpiece is machined in a state in which the crank pin is facing in the horizontal direction (first orientation) due to the structure of jigs. In FIG. 2, "#1P horizontal." indicates that a first crank pin (closest to the engine side) faces the horizontal direction.

The loader then loads the workpiece in the first orientation into the crankshaft turning process machine in the same orientation.

As illustrated in FIG. 3, the workpiece is loaded and unloaded through the workpiece drop openings 6b of the chucks 6R, 6L when loading and unloading the workpiece to and from the crankshaft turning process machine. As a result, in the conventional machine tool, the workpiece is loaded in the first orientation and then unloaded after machining in the same first orientation. The crank pin is the portion indicated as 'Cp' in views A and B in FIG. 3.

Conversely, the crank pin Cp of the workpiece must be set in an orientation facing downward (second orientation) in the crankshaft milling machine. In FIG. 2, "#1P down" indicates that the first crank pin Cp is facing downward. Namely, the phase of the workpiece must be changed 90° while the workpiece is being conveyed from the initial step to the crankshaft milling machine.

In the crankshaft turning process machine of the present embodiment, the workpiece is rotated 90°, that is a phase change of the workpiece is performed, so that the workpiece in the first orientation during loading is changed to the second orientation during unloading.

Phase Change and Machining

Procedures for performing a phase change and machining in the crankshaft turning process machine are described with reference to FIG. 3. As illustrated in FIG. 3(a), the workpiece is in the first orientation (orientation in which the crank pin Cp faces the horizontal direction) as described above at the point in time that the workpiece is loaded into the crankshaft turning process machine.

Procedure 1

From the abovementioned state, the clamping by the right side chuck 6R is released and the workpiece is clamped only by the left side chuck 6L as illustrated in FIG. 3(b). The left side chuck 6L is then rotated 90°. Consequently, the workpiece enters the second orientation in which the crank pin Cp faces downward. The center hole of the workpiece is supported by the center 6c in the right side chuck 6R.

Procedure 2

As illustrated in FIG. 3(c), the workpiece is rotated and cutting is performed on the right side region of the workpiece including the right side journal by the tool 9 while the workpiece is in the clamp state shown in FIG. 3(b), that is in the state in which the right side chuck 6R provides center support and the left side chuck 6L clamps the workpiece.

Procedure 3

The clamping by the left side chuck 6L is released and the workpiece is clamped only by the right side chuck 6R as illustrated in FIG. 3(d). The left side chuck 6L only is then rotated 90° in the direction opposite the previous 90° rotation, so that the workpiece drop opening 6b faces the loader. Since the workpiece is not clamped by the left side chuck 6L at this time, the workpiece does not rotate and remains in the second orientation with the crank pin Cp facing downward. The center hole of the workpiece is supported by the center 6c in the left side chuck 6L.

Procedure 4

As illustrated in FIG. 3(e), the workpiece is rotated and cutting is performed on the left side region of the workpiece including the left side journal by the tool 9 while the workpiece is in the clamp state shown in FIG. 3(d).

Procedure 5

The workpiece is clamped at both ends by both of the chucks 6R, 6L as illustrated in FIG. 3(f), the workpiece is rotated, and the machining of the remaining journal and the like is performed by two of the tools 9.

Procedure 6

After the machining is completed, the workpiece is in the second orientation with the crank pin Cp facing downward, as illustrated in FIG. 3(g), when the rotation angles of the chucks 6R, 6L are in unloading positions, that is, when the workpiece drop openings 6b are facing upward toward the loader.

The workpiece in the above second orientation is unloaded from the crankshaft turning process machine by the loader and loaded into the crankshaft milling machine in the subsequent crank pin machining step in the same orientation. The crank pin of the workpiece set in the second orientation is machined in the crankshaft milling machine.

(1) A phase change of the workpiece can be performed by controlling the clamping and rotation of the chucks 6 in the crankshaft turning process machine. As a result, the provision of a special mechanism for changing the phase is not necessary in the machining line.

(2) The crankshaft turning process machine does not require the addition of structures and the like in comparison to the conventional machine tool, and only changes in a processing program allow for the capability without the need for major changes to the machine tool.

(3) Since the phase change of the workpiece is performed during a grip exchange operation on the workpiece during machining, an increase in the overall machining time can be suppressed.

Other Embodiments

The present invention is not limited to the above embodiments and various changes and modifications may be made without departing from the spirit of the invention.

Although an example of a crankshaft has been described as an example of the workpiece, the present invention may be applicable in the same way to another scroll workpiece such as a cam shaft.

In the machine tool according to the embodiments described herein, a configuration of a machining line can be simplified without major changes the configuration of the machine tools in each of the steps.

What is claimed is:

1. A machine tool for machining a bar-shaped workpiece loaded in a first orientation, the machine tool comprising:
   a first chuck and a second chuck each having a workpiece drop opening that opens toward the outside in a radial direction of the first or second chuck from a middle portion of the first or second chuck, and the first and second chucks being configured to clamp ends of the workpiece loaded through the workpiece drop openings;
   a first driving part and a second driving part respectively provided in correspondence with the first and second chucks to rotate the first and second chucks;
   a machining tool configured to machine the workpiece clamped by at least one of the first chuck and the second chuck; and a control part configured to control clamping of the workpiece by the first and second chucks and to control rotation angles of the first and second chucks by the first and second driving parts to change an orientation of the workpiece from the first orientation to a second orientation, the control part being configured to cause the first chuck to clamp a first end of the workpiece and cause the second chuck to release a second end of the workpiece, cause the first driving part to rotate the first chuck to change the workpiece to the second orientation, cause the second chuck to clamp the second end of the workpiece and cause the first chuck to release the first end of the workpiece, and cause the first driving part to rotate the first chuck to position the first chuck in a loading and unloading position so that the workpiece drop opening of the first chuck faces a workpiece loading and unloading direction.

2. The machine tool according to claim 1, wherein:
the control part is configured to change the orientation of the workpiece during a workpiece grip exchange when machining one end side and another end side in an axial direction of the workpiece.

3. The machine tool according to claim 1, wherein the workpiece is a crankshaft.

4. The machine tool according to claim 3, wherein the machining tool is configured to cut a main journal of the crankshaft and an end on the outside of the main journal in an axial direction.

5. A machine tool for machining a bar-shaped workpiece loaded in a first orientation, the machine tool comprising:

a first chuck and a second chuck each having a workpiece drop opening that opens toward the outside in a radial direction of the first or second chuck from a middle portion of the first or second chuck, and the first and second chucks being configured to clamp ends of the workpiece loaded through the workpiece drop openings;

a first driving part and a second driving part respectively provided in correspondence with the first and second chucks to rotate the first and second chucks;

a machining tool configured to machine the workpiece clamped by at least one of the first chuck and the second chuck; and a control part configured to control clamping of the workpiece by the first and second chucks and to control rotation angles of the first and second chucks by the first and second driving parts to change an orientation of the workpiece from the first orientation to a second orientation, the control part being configured to cause the first chuck to clamp a first end of the workpiece and cause the second chuck to release a second end of the workpiece;

cause the first driving part to rotate the first chuck to change the workpiece to the second orientation;

cause the machining tool to machine a second chuck side region of the workpiece;

cause the second chuck to clamp the second end of the workpiece and cause the first chuck to release the first end of the workpiece;

cause the first driving part to rotate the first chuck to position the first chuck in a loading and unloading position so that the workpiece drop opening of the first chuck faces a workpiece loading and unloading direction;

cause the machining tool to machine a first chuck side region of the workpiece; and cause the first chuck and the second chuck to clamp the ends of the workpiece to machine a remaining area of the workpiece with the machining tool.

6. The machine tool according to claim 5, wherein the workpiece is a crankshaft.

7. The machine tool according to claim 6, wherein the machining tool is configured to cut a main journal of the crankshaft and an end on the outside of the main journal in an axial direction.

\* \* \* \* \*